United States Patent Office 3,067,185
Patented Dec. 4, 1962

3,067,185
POLYMERIZATION OF OLEFINIC COMPOUNDS IN THE PRESENCE OF CATALYSTS HAVING A TRI-ALKYL BORON BASE
Robert De Coene and Alexis Mathieu, Brussels, Belgium, assignors to Solvic Societe Anonyme, Brussels, Belgium, a Belgian company
No Drawing. Filed July 28, 1959, Ser. No. 829,959
Claims priority, application Belgium Aug. 2, 1958
2 Claims. (Cl. 260—92.8)

The present invention relates to an improved method of polymerizing and/or copolymerizing compounds containing at least one ethylenic double bond, wherein use is made of especially active new catalytic systems having a trialkyl boron base which are capable of permitting the polymerization and/or copolymerization of said compounds at low temperatures under atmospheric pressure.

It is known in accordance with Belgian Patents Nos. 560,624, 562,433 and 562,701 to be possible to polymerize and/or copolymerize compounds containing the group >C=C< at low temperatures and under atmospheric pressure in the presence of organic boron compounds corresponding to the general formula $BR_3$ in which R represents an alkyl group. The polymers and/or copolymers obtained in accordance with said patents show improved mechanical properties and have a high rate of crystallinity.

It is likewise known that it is possible to increase the activity of the catalysts with a trialkyl boron base for the polymerization of certain vinyl compounds by effecting the said polymerization in the presence of a certain amount of oxygen.

It has now been found that the activity of catalysts with a trialkyl boron base for the polymerization and/or copolymerization of compounds containing an ethylenic double bond can be even more notably increased by effecting the polymerization and/or the copolymerization in the presence of a certain quantity of oxygen and of a small amount of water.

The improved process forming the subject of the present invention consists in polymerizing and/or copolymerizing compounds corresponding to the general formula:

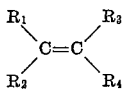

wherein $R_1$, $R_2$, $R_3$ and $R_4$ represent hydrogen, saturated or unsaturated linear, branched, or cyclic hydrocarbon radicals, heterocyclic radicals, hydrocarbon radicals substituted with halogens, polar atoms and/or groups such as halogens, ester, ether and —CN groups, in the presence of a catalyst constituted by organic derivatives of boron which correspond to the general formula $BR_3$ wherein R is an alkyl radical, of a small amount of oxygen and a small amount of water.

The amount of oxygen to be used is comprised between 0.001 and 0.2% by weight of the monomer or monomers to be polymerized and/or copolymerized, while the amount of water necessary for the advanced activation of the catalyst may vary between 0.001 and 2% by weight of the monomer or monomers to be polymerized and/or copolymerized.

Among the compounds capable of being polymerized and/or copolymerized in the presence of such catalytic systems may be mentioned, inter alia, olefins such as ethylene, propylene, butylene, iso-olefins, dienic hydrocarbons, styrene and its derivatives by substitution in the aromatic nucleus, vinyl chloride, vinylidene chloride, trichloroethylene, perchloroethylene, vinyl fluoride, vinylidene fluoride, trifluoroethylene, perfluoroethylene, chlorotrifluoroethylene, chlorofluoroethylenes, vinyl esters such as vinyl acetate, vinyl ethers, esters of acrylic acid and substitution products thereof with halogens, esters of methacrylic acid and substitution products thereof with halogens, allyl halides and esters, acrylonitrile, methacrylonitrile, vinylpyridine, etc.

Monomers corresponding to the hereinabove general formula may be copolymerized among themselves according to the present process. Binary or ternary copolymers are thereby obtained in accordance with the conditions of operation.

The amount of trialkyl boron catalyst to be used is between 0.01 and 3% by weight of the amount of the monomer or monomers used. Of the trialkyl boron derivatives, triethyl boron or normal tributyl boron will be preferably chosen.

The polymerization and/or copolymerization can be carried out in bulk or in the presence of an inert organic medium.

The catalytic system enables the polymerization and/or copolymerization to be effected at extremely low temperatures and yet with still appreciable yields.

The polymers and/or copolymers obtained in accordance with the process of the present invention are marked by improved mechanical properties and by a high crystallinity index.

The invention is explained in detail with reference to the examples given below, which are here given entirely by way of illustration and do not in any sense limit the scope of the invention. The latter may undergo modifications without exceeding said scope.

*Example 1*

1500 g. of vinyl chloride are put into a balloon flask of 2 liter capacity having 3 necks and provided with a mechanical stirring means and with a thermometric sheath, the air having been driven out by a current of dry nitrogen. The vinyl chloride is brought to boiling while stirring and kept boiling for 5 minutes. While still stirring and in a nitrogen atmosphere, the vinyl chloride is brought to −40° C. and 2 cc., i.e. 1.5 g. of normal tributyl boron are added. At the end of 4 hours of polymerization at −40° C., 2 g. of polyvinyl chloride are collected.

*Example 2*

The operation is carried out exactly as in the preceding example, but 1.5 cc., that is 1.5 g., of water are added at the same time as the normal tributyl boron. At the end of 4 hours of polymerization, 1 g. of polyvinyl chloride is obtained.

*Example 3*

1500 g. of vinyl chloride are introduced in a flask of 2 liter capacity having 3 necks and provided with a mechanical stirring means and with a thermometric sheath, after the air has been driven out by a current of dry nitrogen. Still stirring the vinyl chloride is brought to boiling and this is maintained for 5 minutes. With continued stirring and in a nitrogen atmosphere, the vinyl chloride is cooled to −40° C. The apparatus is subjected to vacuum until the vinyl chloride boils; the pressure is then about 150 mm. mercury. 900 cc. of oxygen are injected under a partial pressure of 30 mm. Hg, corresponding to 0.054 g. of oxygen. Atmospheric pressure is thereafter restored with pure dry nitrogen. 2 cc. of normal tributyl boron are then added and after 4 hours of polymerization at −40° C., 70 g. of polyvinyl chloride are collected.

*Example 4*

The operation proceeds in exactly the same way as in

Example 3, but at the same time as the normal tributyl boron, a little less than 0.1 cc. of water is added. After 4 hours of polymerization at $-40°$ C., 95 g. of polyvinyl chloride are collected.

These four examples sufficiently demonstrate the spectacular synergistic action of the oxygen and water.

*Example 5*

The operation proceeds as in Example 3, but is carried out in the presence of 0.048 g. of oxygen (900 cc. at 28 mm. Hg) and of 1 cc. of triethyl boron, i.e. 0.85 g. At the end of 4 hours of polymerization at $-40°$ C., 65 g. of polyvinyl chloride are collected.

To obtain the same amount of polyvinyl chloride by operating in the same way but in the presence of 1 cc. of water, only 3 hours are required.

*Example 6*

The operation proceeds as in Example 5, but the amount of oxygen present is 0.058 g. (900 cc. at 34 mm. Hg). At the end of 4 hours of polymerization at $-40°$ C., 68 g. of polyvinyl chloride are collected.

If the operation is carried out, moreover, in the presence of 0.2 cc. of water, at the end of 3 hours of polymerization at $-40°$ C., 66 g. of polyvinyl chloride are collected, while in the presence of 10 cc. of water, 70 g. of polyvinyl chloride are collected after the same lapse of time.

On the other hand, if the work is carried on in presence of air, at atmospheric pressure, only traces (0.2 g.) of polymer are obtained at the end of 4 hours of polymerization.

We claim:

1. A method of polymerizing vinyl chloride which comprises effecting polymerization of said vinyl chloride in contact with an organic boron compound having the general formula $BR_3$, wherein R is an alkyl radical, 0.001 to 0.2% of molecular oxygen, and 0.001 to 2% of water, the quantity of said oxygen and the quantity of said water being based upon the weight of said vinyl chloride, and said 0.001 to 2% of water being the only water present in the polymerization system.

2. A method of polymerizing vinyl chloride which comprises effecting polymerization of said vinyl chloride in bulk in contact with an organic boron compound having the general formula $BR_3$ wherein R is an alkyl radical, 0.001 to 0.2% of molecular oxygen, and 0.001 to 2% of water, the quantity of said oxygen and the quantity of said water being based upon the weight of said vinyl chloride, and said 0.001 to 2% of water being the only water present in the polymerization system.

References Cited in the file of this patent

UNITED STATES PATENTS 2,985,633     Welch _____ May 23, 1961

OTHER REFERENCES

J. Poly. Sci., vol. 26, pages 234–236 (page 235 especially relied upon) (1957).

Hackh's Chemical Dictionary, 3rd edition, McGraw-Hill, Book Co., page 421.

J. Poly. Science, vol. 28, page 227–229 (1958).